(12) United States Patent
Bhojan

(10) Patent No.: US 10,474,561 B2
(45) Date of Patent: Nov. 12, 2019

(54) METHOD AND SYSTEM FOR AUTOMATED TESTING OF HUMAN MACHINE INTERFACE (HMI) APPLICATIONS ASSOCIATED WITH VEHICLES

(71) Applicant: Wipro Limited, Bangalore (IN)

(72) Inventor: Rajkumar Joghee Bhojan, Sharon, MA (US)

(73) Assignee: Wipro Limited, Bangalore (IN)

( * ) Notice: Subject to any disclaimer, the term of this patent is extended or adjusted under 35 U.S.C. 154(b) by 175 days.

(21) Appl. No.: 15/675,335

(22) Filed: Aug. 11, 2017

(65) Prior Publication Data
US 2019/0050322 A1 Feb. 14, 2019

(51) Int. Cl.
G06F 11/36 (2006.01)
G06F 3/041 (2006.01)
G06N 20/00 (2019.01)

(52) U.S. Cl.
CPC ........ *G06F 11/3684* (2013.01); *G06F 3/0416* (2013.01); *G06N 20/00* (2019.01)

(58) Field of Classification Search
CPC ............. G06F 11/3684; G06F 11/3688; G06F 11/3692; G06F 3/0416
See application file for complete search history.

(56) References Cited

U.S. PATENT DOCUMENTS

| 6,507,842 B1 * | 1/2003 | Grey | G06F 11/3672 |
| 2011/0209123 A1 * | 8/2011 | Kaur | G06F 11/3684 717/126 |
| 2011/0209124 A1 * | 8/2011 | Kaur | G06F 11/3672 717/126 |
| 2014/0298297 A1 * | 10/2014 | Prasad | G06F 11/3684 717/125 |
| 2015/0228125 A1 * | 8/2015 | Silva | G01C 21/362 705/13 |
| 2015/0269788 A1 * | 9/2015 | Elliott | G07C 5/008 701/31.5 |
| 2016/0062879 A1 | 3/2016 | Tan et al. | |
| 2016/0210226 A1 * | 7/2016 | Hall | G06F 11/3672 |
| 2017/0228311 A1 * | 8/2017 | Lee | G06F 11/3664 |

FOREIGN PATENT DOCUMENTS

EP 2615555 A1 7/2013

* cited by examiner

Primary Examiner — Yolanda L Wilson
(74) Attorney, Agent, or Firm — Pepper Hamilton LLP

(57) ABSTRACT

A method and a testing tool for automated testing of HMI applications includes: identifying, at least one vehicle from a plurality of vehicles as HMI enabled vehicle, and a HMI application installed on an electronic device corresponding to the at least one vehicle; identifying one or more errors in one or more additional features being integrated with the HMI application; generating test data based on one or more test scripts related to the one or more additional features and historical test analysis of the HMI application; and executing the one or more test scripts on the HMI application based on the test data for automated testing of Human Machine Interface (HMI) applications associated with vehicles. The disclosed method and the testing tool provide a common framework for testing HMI applications of various vehicles.

27 Claims, 7 Drawing Sheets

METHOD AND SYSTEM FOR AUTOMATED TESTING OF HUMAN MACHINE INTERFACE (HMI) APPLICATIONS ASSOCIATED WITH VEHICLES

FIELD

The present disclosure relates to automated testing of applications. More particularly, but not specifically, the present invention relates to automated testing of Human Machine Interface (HMI) applications.

BACKGROUND

Human Machine Interface (HMI) is a medium that enables interaction between humans and machines (robots, vehicles, computers, etc). Most commonly, the HMI is enabled through applications. The applications are installed in electronic devices, which are enabled to receive inputs from a user. In automotive industries, applications are used to perform various functions in a vehicle. For example, using mobile applications, doors of the vehicles can be opened and closed. Likewise, various functions may be performed. Sensors and actuators are installed on the vehicle that enables to perform the functions. A vehicle infotainment system installed in a vehicle helps in interaction between the vehicle and the application operated by the user.

Currently, many vehicle manufacturers develop applications for the vehicles. The application is tested using automated testing tools developed particularly for the application. For example, consider a vehicle AUDIR. AUDICONNECTR is a mobile application to control the AUDIR vehicle. AUDIR company would adapt automated testing tools that are developed to test the AUDICONNECTR. Likewise, companies like BMWR, CHEVROLETR, etc. may adapt automated testing tools that are developed to test respective applications only. Thus, the testing tool cannot be used for testing other applications. The automated testing is limited to testing features of the application that are associated to electronic device in which the application is installed. For example, the automated tests are performed for features like compatibility of the application with the electronic device, accessibility of data and other applications installed in the electronic device by the application, and the like. Another example may be, automated tests are performed for checking whether the HMI application can access imaging application on the electronic device. Thus, all automated testing of HMI application is performed with respect to the electronic device it is installed on, and not with respect to connected devices or HMI features.

Several platforms are present for testing HMI feature of multiple applications. However, the testing of the HMI feature is performed manually. Therefore, existing testing platforms do not automate the process of testing HMI feature of applications due to complexity involved in automating the process of testing. Especially, during regression testing, new features are integrated to the application, and accordingly testing has to be performed. As a result, time and resources spent on manual testing is very high. Also, quality of testing performed manually may vary and hence is not reliable.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method of automated testing of Human Machine Interface (HMI) applications associated with vehicles. The method comprises identifying, by an automation testing tool, at least one vehicle from a plurality of vehicles as HMI enabled vehicle, and a HMI application installed on an electronic device corresponding to the at least one vehicle, based on one or more inputs, where the HMI application comprises a plurality of features for controlling one or more functions of the at least one vehicle, identify one or more errors in one or more additional features being integrated with the HMI application in real-time, where the one or more errors are eliminated to enable integration of the one or more additional features with the HMI application, generate test data based on one or more test scripts related to the one or more additional features and historical test analysis of the HMI application corresponding to the plurality of vehicles, where the test data is input to the HMI application and execute the one or more test scripts on the HMI application based on the test data for automated testing of Human Machine Interface (HMI) applications associated with vehicles.

In an embodiment, the present disclosure relates an automation testing tool for automated testing of Human Machine Interface (HMI) applications associated with vehicles, comprising, a processor and a memory. The processor is configured to identify at least one vehicle from a plurality of vehicles and a HMI application installed on an electronic device corresponding to the at least one vehicle, based on one or more inputs, where the HMI application comprises a plurality of features for controlling one or more functions of the at least one vehicle, identify one or more errors in one or more additional features being integrated with the HMI application in real-time, wherein the one or more errors are eliminated to enable integration of the one or more additional features with the HMI application, generate test data based on one or more test scripts related to the one or more additional features and historical test analysis of the HMI application corresponding to the plurality of vehicles, where the test data is input to the HMI application and execute the one or more test scripts on the HMI application based on the test data for automated testing of Human Machine Interface (HMI) applications associated with vehicles.

In an embodiment, the present disclosure relates to a non-transitory computer readable medium including instructions stored thereon that when processed by at least one processor cause a device. the processor is configured to identify at least one vehicle from a plurality of vehicles as HMI enabled vehicle, and a HMI application installed on an electronic device corresponding to the at least one vehicle, based on one or more inputs, where the HMI application comprises a plurality of features and one or more additional features being integrated with the HMI application for controlling one or more functions of the at least one vehicle, identify in real-time, one or more errors in the one or more additional features being integrated with the HMI application, where the one or more errors are eliminated to enable integration of the one or more additional features with the HMI application, generate test data based on one or more test scripts related to the one or more additional features and historical test analysis of the HMI application corresponding to the plurality of vehicles, where the test data is input to the HMI application, and executing the one or more test scripts on the HMI application based on the test data for automated testing of Human Machine Interface (HMI) applications associated with vehicles.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
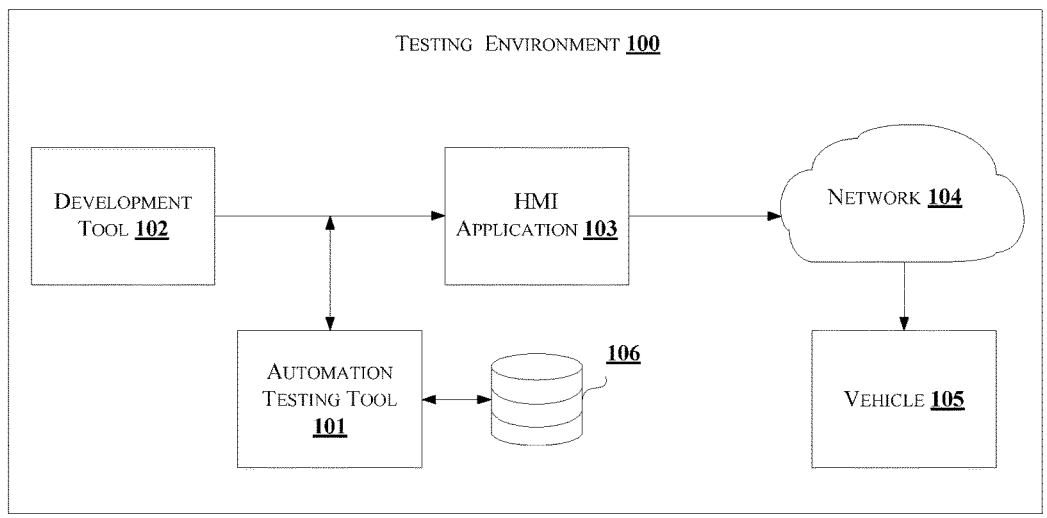
FIG. 1 shows an exemplary testing environment for automated testing of HMI applications, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps do not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to automated testing of human Machine Interface (HMI) applications associated with vehicles. The present disclosure discloses a method and an automation testing tool for performing automated regression test of HMI applications. Regression test is performed when additional features are integrated with plurality of existing features of the HMI applications. The automated testing of the HMI applications reduces manual labor involved in the testing process and thus reduces overall cost of testing.

FIG. 1 shows an exemplary testing environment 100. The testing environment comprises an automation testing tool 101, a development tool 102, a HMI application 103, a network 104, a vehicle 105 and a database 106. The development tool 102 may be used to develop a code for the HMI application 103. The HMI application 103 may be installed in an electronic device (not shown in the figure). In an embodiment, the electronic device may include but is not limited to, a laptop, a Personal Device Assistant (PDA), a mobile phone, a smartphone, or any computing device. In an embodiment, the database 106 may store at least one of, data of a plurality of vehicles, data of HMI applications corresponding to the plurality of vehicles, test data for the HMI applications, and test scripts of the HMI applications.

The HMI application 103 may comprise a plurality of features for controlling one or more functions of a vehicle 105. In an embodiment, the plurality of features may include, but are not limited to, button features, input features, connectivity feature, and the like. In an embodiment, the one or more functions may include, but are not limited to, monitoring fuel of the vehicle 105, controlling doors and windows of the vehicle 105, locking and unlocking the vehicle 105, and the like. The HMI application 103 is associated with the vehicle 105. For example, when there are 10 vehicles which are HMI enabled, each of the 10 vehicles may be associated with a corresponding HMI application, i.e., an AUDIR car may be controlled using an AUDICONNECTR application. Likewise, a BMWR car may be controlled using a MYBMWR application. In an embodiment, the HMI application 103 may be connected to the vehicle 105 through one of wired or wireless interface. In an embodiment, the automation testing tool 101 may be connected to the database 106 through one of wired or wireless interface. The development tool 102 may integrate one or more additional features with the HMI application 103. The one or more additional features may be used to control the one or more functions or one or more additional functions of the vehicle 105. The automation testing tool 101 receives one or more inputs from a user for testing the HMI application 103 associated with the vehicle 105. Then, the automation testing tool 101 identifies whether the vehicle 105 is HMI enabled. Further, the automation testing tool 101 identifies the HMI application 103 associated with the vehicle 105. In an embodiment, the automation testing tool 101 checks the one or more additional features to be integrated with the HMI application 103 and identifies one or more errors in the one or more additional features in real-time. In an embodiment, the one or more errors may include, but are not limited to, syntax errors, configuration errors, compatibility errors, integration errors, and the like. For example, consider a new additional feature to be integrated with the HMI application. Let us consider that the additional feature has a bug that may not allow normal functioning of the existing feature when integrated with the HMI application 103. The automation testing tool 101 checks the additional feature for any bugs and reports to a developer. The developer may fix the bug and provide the additional feature to the automation testing tool 101 for integration. Thus, the new additional feature may be integrated with the HMI application without any errors, thereby enabling proper functioning of the HMI application 103. The identification of the one or more errors helps in improving quality of the HMI application 103 and enables proper functioning of the HMI application 103. Further, the automation testing tool 101 generates test data for the one or more additional features based on one or more test scripts related to the one or more additional features and historical test analysis of the HMI application 103. In an embodiment, the one or more test scripts may be retrieved from the database 106. Alternatively, a user may provide the automation testing tool 101 with the one or more test scripts. In an embodiment, the test data may be generated based on historical analysis of the HMI application 103. The test data may be generated in real-time when the one or more additional features are integrated with the HMI application 103. The test data may be provided to the HMI application 103 for execution. Further, the automation testing tool 101 executes the one or more test scripts based on the test data. Thus, the automation testing tool 101 automates the process of testing, thereby providing an efficient way of testing the plurality of features as well as the one or more additional features of the HMI application 103.

Figure 2:
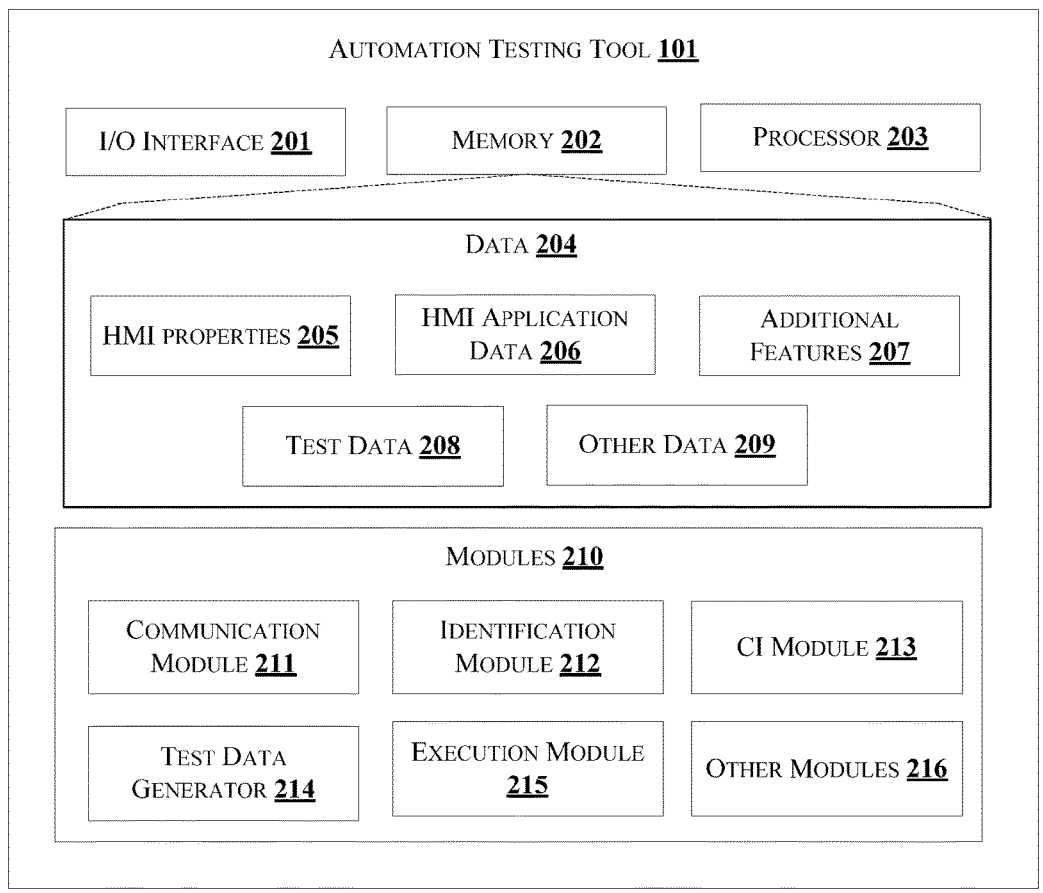
FIG. 2 shows an exemplary block diagram of internal architecture of an automation testing tool, for automated testing of HMI applications, in accordance with some embodiments of the present disclosure.

FIG. 2 illustrates internal architecture of the automation testing tool 101 in accordance with some embodiments of the present disclosure. The automation testing tool 101 may include at least one Central Processing Unit ("CPU" or "processor") 203 and a memory 202 storing instructions executable by the at least one processor 203. The processor 203 may comprise at least one data processor for executing program components for executing user or system-generated requests. The memory 202 is communicatively coupled to the processor 203. The automation testing tool 101 further comprises an Input/Output (I/O) interface 201. The I/O interface 201 is coupled with the processor 203 through which an input signal or/and an output signal is communicated.

In an embodiment, data 204 may be stored within the memory 202. The data 204 may include, for example, HMI properties 205, HMI application data 206, additional features 207, test data 208 and other data 209.

In an embodiment, the HMI properties 205 may include, but are not limited to HMI ports, HMI connectivity data, and the like.

In an embodiment, the HMI application data 206 may include, but is not limited to application code, application specification, application version, and the like.

In an embodiment, the additional features 207 may indicate any feature related to the HMI application 103 to control the one or more functions of the vehicle 105. The additional features 207 may be used to control the one or more existing functions of the vehicle 105 or may be used to control one or more newly added functions of the vehicle 105. For example, let opening windows of the vehicle 105 be a function and let a button or touch input in the HMI application 103 be an existing feature. In one embodiment, an additional feature 207 may be opening the windows partially. The additional feature 207 is used to control existing function of the vehicle 105. In another embodiment, the additional feature 207 may be used to open door of the vehicle 105. The additional feature 207 is used to control a new function of the vehicle 105. Another example of the additional feature 207 may be remotely controlling headlamps of the vehicle 105. The headlamps may be turned off or on using the HMI application 103.

In an embodiment, the test data 208 may indicate inputs to test each of the plurality of features of the HMI application 103.

In an embodiment, the other data 209 may include, but is not limited to test cases, test scenarios, vehicle data and the like. Also, the other data 209 may include machine learning techniques for identifying the vehicle 105 and the associated HMI application 103.

In an embodiment, the data 204 in the memory 202 is processed by modules 210 of the automation testing tool 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 210 when configured with the functionality defined in the present disclosure will result in a novel hardware.

In one implementation, the modules 210 may include, for example, a communication module 211, an identification module 212, a Continuous Integration (CI) module 213, a test data generator 214, an execution module 215 and other modules 216. It will be appreciated that such aforementioned modules 210 may be represented as a single module or a combination of different modules.

In an embodiment, the communication module 211 receives one or more inputs from the user. Also, the communication module 211 may receive data from the database 106. Further, the communication module 211 may communicate data to the HMI application 103. The communication module 211 may receive vehicle data, and related test data from the database 106. In an embodiment, the communication module 211 may communicate instructions to the HMI application 103 during execution of the one or more test scripts.

In an embodiment, the one or more inputs may include, but are not limited to, vehicle model data, vehicle type, vehicle make, vehicle name, unique number of the electronic device, electronic device type, electronic device name, electronic device model data, HMI compatibility of the at least one Vehicle, or HMI application data.

In an embodiment, the identification module 212 identifies the vehicle 105, based on the one or more inputs. Further, the identification module 212 determines whether the vehicle 105 is HMI enabled. When the identification module 212 determines that the vehicle is HMI enabled, then corresponding HMI application 103 is retrieved from the database 106. In an embodiment, the user may provide the HMI application 103. The HMI application 103 may be identified and retrieved from the database 106 or the HMI application 103 may be identified from the electronic device.

In an embodiment, the identification module 212 may adapt machine learning techniques to identify the vehicle 105 and the associated HMI application 103. An example of machine learning technique may be Random Forest technique. In an embodiment, the HMI application 103 may be provided to the automation testing tool 101 for testing. Alternatively, the automation testing tool 101 may identify the HMI application 103 from the electronic device for testing.

In an embodiment, the CI module 213 checks the one or more additional features to be integrated with the HMI application 103 in real-time. The CI module 213 integrates the additional features with the HMI application 103. Integration may comprise building compatibility between existing plurality of features and the one or more additional features. Thus, the CI module 213 enables complete functioning of the HMI application 103 post integration of the one or more additional features. Examples of the CI module 213 may be, but is not limited to, JENKINS™, TRAVIS™, BUILDBOT™ and the like. The CI module 213 helps improve quality of the one or more additional features to be integrated with the HMI application 103.

In an embodiment, the test data generator 214 generates test data for the one or more additional features. The test data generation is based on the one or more test scripts of the one or more additional features and the historical test analysis of the HMI application 103. The one or more test scripts of the one or more additional features and the historical test analysis of the HMI application 103 may be provided by the user or may be retrieved from the database 106. Examples of test data may include, name of the city street address, zip code and country. The test data may further depend on complexity of the HMI application 103 and the one or more additional features. Hence, the test data generator 214 may generate the test data in real-time and is input to the HMI application 103 before execution of the one or more test scripts.

In an embodiment, the execution module 215 executes the one or more test scripts based on the test data. The execution of the one or more test scripts comprises checking of each of the plurality of features and each of the one or more additional features. The execution of the one or more test scripts concludes the automated process of testing the HMI application 103.

In an embodiment, the other modules 216 may include, but are not limited to report generation module, interface and connectors, vehicle module, test script generator, configuration module, main controller etc.

In an embodiment, the main controller may be an important component of the automation testing tool 101. A driver script may be working as the main controller, through which communications between different modules may take place. Communication between the one or more test scripts and configuration files, communication between the one or more test scripts and object repository, report files, configuration/eXtensible Markup Language (XML) files may take place through the driver script. A unique driver script may be the top most level of hierarchy which may include main class scripts. The main class scripts may act as the main controller for rest of other test artifacts.

In an embodiment, in the configuration module, XML files may be used as configuration files. The configuration files may be used for configuring initial connections between HMI application 103, cloud server results, object repository files and the one or more test scripts. In order to change any setting without recompiling framework architecture, the configuration files may be used.

In an embodiment, the test script generator, may generate one or more test scripts for the one or more additional features and the plurality of features. Based on the inputs derived from test data generator 214, the one or more test scripts may be executed. A test script is a set of instructions that may be performed on a system under test to test that an application functions as expected. In an embodiment, the test data generator 214 may provide test data for testing the one or more additional features. Further, the test data generator 214 may provide test data for testing the one or more additional features along with existing plurality of features of the HMI application 103.

In an embodiment, the report generation module may generate customized reports after execution of the one or more test scripts. A copy of recent results may be displayed on a live dashboard. All the results from various tests may be stored in the database 106 and the results may be sorted based on date, defect density, and test modules.

In an embodiment, in the vehicle module may be present in the vehicle 105. The vehicle module may receive commands from the automation testing tool 101 for performing one or more actions. For example, AUDICONNECTR may send "Lock" or "Unlock" commands from the HMI application 103 installed on the electronic device to the vehicle 105, and the corresponding action may be performed on the vehicle 105. When the action is taking place, the automation testing tool 101 may receive a notification regarding request and response time between the vehicle 105 and HMI application 103.

In an embodiment, the interfaces may be standard interface such as Small Computer System Interface (SCSI) for physically connecting and transferring data. Interfaces may be used for communication between the primary system and other systems. Connectors may be used for communication between various modules within the primary system. Interfaces may be Application Program Interfaces (APIs) published by external modules, whereas connectors may be internal APIs to communicate between the internal modules of primary system.

Figure 3:
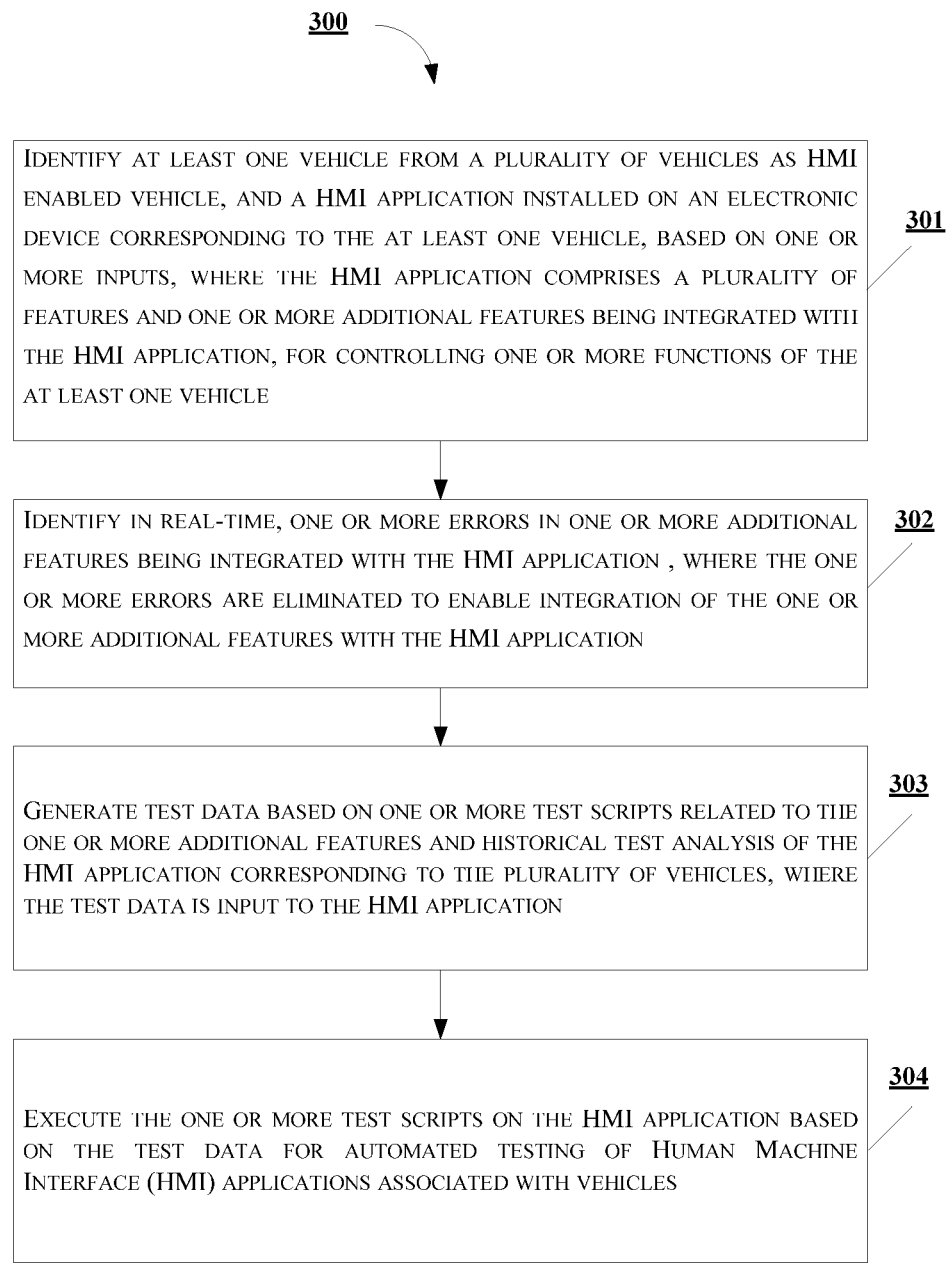
FIG. 3 is a flow chart indicative of method steps of automated testing of HMI applications, in accordance with some embodiments of the present disclosure.

FIG. 3 shows a flow chart illustrating a method for automated testing of HMI application 103, in accordance with some embodiments of the present disclosure.

As illustrated in FIG. 3, the method 300 may comprise one or more steps for automated testing of HMI application 103, in accordance with some embodiments of the present disclosure. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 301, the identification module 212 identifies the vehicle 105 from the plurality of vehicles. The identification may be based on one or more inputs from the user. The identification further comprises identifying the HMI application 103 corresponding to the vehicle 105. The identification module 212 determines whether the vehicle 105 is HMI enabled.

Figure 4:
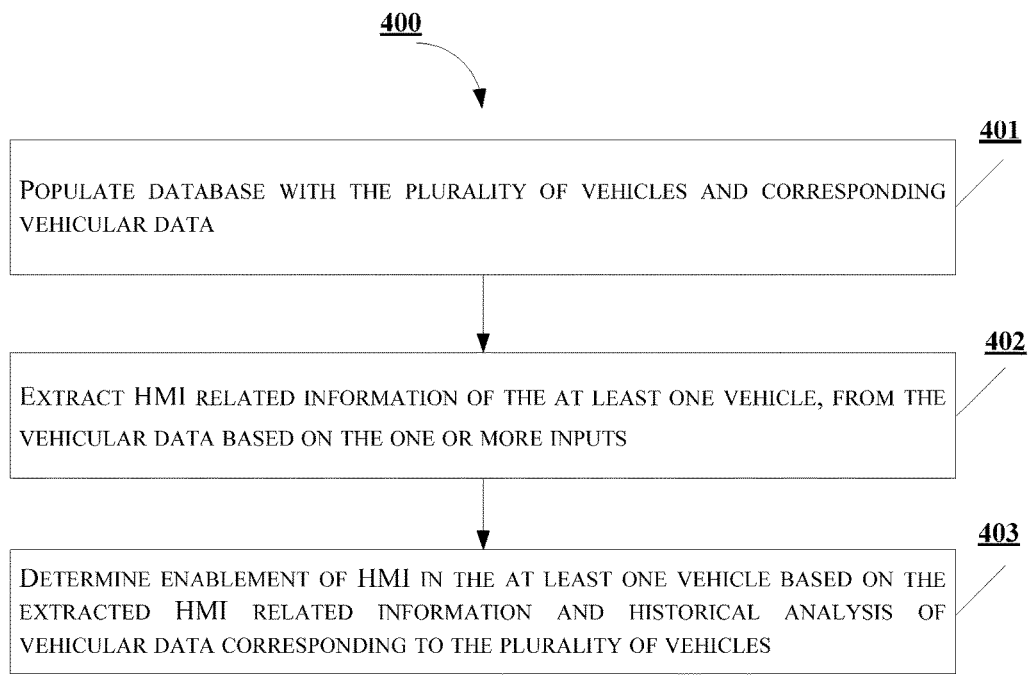
FIG. 4 is a flow chart indicative of method steps of determining presence of HMI feature in a HMI application, in accordance with some embodiments of the present disclosure.

Now referring to FIG. 4, the steps involved in determining whether the vehicle 105 is HMI enabled is disclosed.

At step 401, the database 106 is populated with the plurality of vehicles. The database 106 is filled with details of the plurality of vehicles. The details may include, but are not limited to vehicle name, vehicle make, vehicle type, vehicle model, vehicle color, vehicle specification, and the like. The vehicle 105 is identified from the plurality of vehicles based on the one or more inputs from the user.

At step 402, HMI related data of the vehicle 105 is extracted from the database 106. The HMI related data may be HMI ports, HMI connectivity data, and the like. The details of the plurality of vehicles are processed and details related only to HMI features of the vehicle 105 are extracted. In an embodiment, the extraction may be performed by removing unwanted details from the details of the plurality of vehicles. Further, the extracted HMI related data may be normalized such that all the HMI related data are in a format readily available for the automation testing tool 101.

Figure 6:
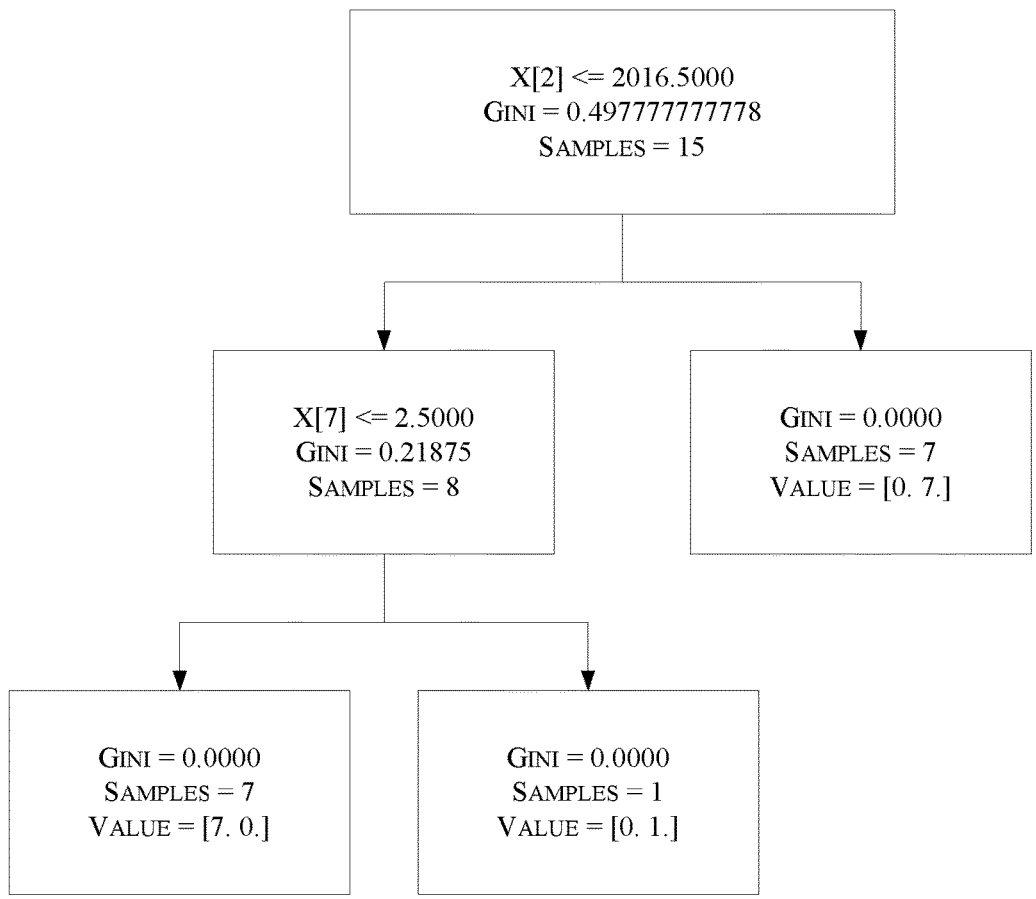
FIG. 6 is an exemplary block diagram indicative of tree structure for identifying vehicles, in accordance with some embodiments of the present disclosure.

At step 403, the identification module 212 determines whether the vehicle 105 is HMI enabled based on the HMI related data. Further, the identification module may use machine learning techniques to identify whether the vehicle 105 is HMI enabled. An example of the machine learning technique may be Random Forest technique. The Random Forest technique is an ensemble learning method that takes average results of several decision trees to classify samples. Each decision tree among a plurality of decision trees is trained on a random training data subset, using random features. Random Forest technique takes a subset of observations and a subset of variables to build a decision tree for each vehicle model. This technique builds multiple decision trees and amalgamate the multiple trees together to get a more accurate prediction. For instance, the said technique may take a random sample of 100 observation and 5 randomly chosen initial variables to build a model. In a non-limiting embodiment, the technique may repeat the process for 10 times and then make a final prediction on each observation of the vehicle models. A final prediction may be made for predicting whether the given vehicle is HMI enabled or not. The final prediction may be a mean of each prediction. The decision tree may consist of decision nodes. The decision tree may pose a question and the nodes may be chosen based on answer for the question. Each leaf node may be a prediction for the question. For example, let us consider a vehicle which is not HMI enabled in the year 2016. Further let us consider, that the technique has made 6 observations of this vehicle and has categorized as HMI not enabled. Further, let us consider that manufacturer of the vehicle has rolled out HMI feature in the vehicle in 2017, and the technique has made 22 observations and has categorized as HMI enabled. When the vehicle is next observed using the technique, the vehicle shall be considered as HMI enabled based on mean value of categorization of the vehicle. FIG. 6 shows a representation of implementation of the Random Forest technique.

Let us consider an example. Let car 1 and car 2 have the following features as given in the Table 1:

TABLE 1

| Name | Model | Year | Fuel type | Cylinders | Transmission type |
|---|---|---|---|---|---|
| Car 1 UDI$^R$ | A4 | 2017 | Premium | 4 | Automatic |
| Car 2 MAZDA$^R$ | 2 | 2014 | Regular | 4 | Manual |

When the user provides following inputs: name: AUDIR; model: A4; year: 2017, then the identification module 212 retrieves HMI related data of car 1 from the database 106 and determines that car 1 is HMI enabled.

Likewise, when the following inputs are provided: name: MAZDAR; year: 2014; transmission type: manual; the identification module 212 retrieves car 2 from the database 106 and determines that car 2 is not HMI enabled. The car 2 may be determined as HMI not enabled by considering the HMI data related to car 2. For example, the identification module 212 checks whether car 2 comprises interfaces to connect to external devices. Thus, the identification module 212 determines that car 2 may not comprise key feature of communicating with external devices and thus determines car 2 is not HMI enabled.

In an embodiment, each vehicle 105 and its corresponding HMI application 103 may be linked with a unique number of the electronic device. For example, if the user's electronic device number has the AUDICONNECTR app, then the identification module 212 verifies with whether the selected vehicle 105 is HMI enabled. The automation testing tool 101 is used to accommodate appropriate HMI applications 103 by correlating user's electronic device numbers and corresponding vehicles for a large number of combinations.

Referring now back to FIG. 3, at step 302, the CI module 213 identifies the one or more errors in the one or more additional features to be integrated with the HMI application 103. The CI module 213 continuously check for the one or more additional features that are integrated with the HMI application 103 and stores the one or more errors in the database 106 in real-time. In an embodiment, the one or more errors may be reported to developers for rectification.

For example, when an additional feature to be integrated with the HMI application 103 is in conflict with existing code of the HMI application 103, the CI module 213 may identify errors or bugs in code of the additional feature causing conflicts. The errors or bugs may be reported to the developers for rectification, for enabling proper functioning of the HMI application 103.

At step 303, the test data generator 214 generates the test data for the one or more additional features. The test data may be generated in real-time and may depend on the one or more test scripts of the one or more additional features. Also, the test data may be generated based on historical test analysis of the HMI application 103. The test data is input to the HMI application 103. Machine learning techniques may be employed for generating the test data based on historical test analysis of the HMI application 103. The machine learning techniques may learn types of test data generated for different test scripts. Over a course of time, the machine learning techniques may automatically generate test data for a given test script. For example, let us consider that test data to check working of an AUDIR with two doors is already present in the database 106. During testing a BMWR car having two doors, machine learning techniques may identify that test data used for testing door features of the AUDIR car may be used for testing door features of the BMWR car. An example of test data may be, a voice command "open right door", or "open left door". Further, for a new test data generated, corresponding details like test script, HMI feature, and user inputs may be stored in the database 106.

In an embodiment, the test data and the one or more test scripts used for a particular type of electronic device, and particular operating system, may be used for a different type of electronic device having a different operating system.

At step 304, the execution module 215 executes the one or more test scripts of the one or more additional features based on the test data. The execution of the one or more scripts may include transmitting a command or request from the HMI application 103 to the vehicle 105. Further, an acknowledgement is received from the vehicle 105 for the transmitted command or request. The acknowledgement is analyzed by the automation testing tool 101.

In an embodiment, a plurality of objects may be generated and stored in the database 106. The objects may relate to the HMI application 103. For example, objects may include, but are not limited to, buttons in the HMI application 103, input text field, voice commands, gestures, user credentials, and the like. For example, a lock and unlock feature may be present in many HMI applications 103. However, the lock and unlock feature in each of the HMI applications 103 may be different based on the corresponding vehicle 105. The automation testing tool 101 may consider the lock and unlock feature as objects and store it in the database 106. In an instance, the database 106 may be an object repository. During execution of the one or more test scripts of the one or more additional features, the objects may be retrieved and may be used for execution.

In an embodiment, performance of the HMI application 103 in different electronic device is determined. The HMI application 103 may be installed in a plurality of electronic devices. The performance of the HMI application 103 in each of the plurality of electronic devices is determined based on the analysis made by the automation testing tool 101. Further, a report may be generated showing performance of the HMI application 103 in each of the plurality of electronic devices. The performance comparison may provide insights on code correction or quality improvement to be needed. In an embodiment, performance analysis may be performed for a vehicle 105 on different operating systems. For example, performance of AUDICONNECTR HMI application 103 may be analyzed by testing the HMI application 103 on ANDROIDR, IOSR, WINDOWSR and the like. Request and response time of data communicated from the HMI application 103 using each of the operating system may be noted and compared for determining performance of the HMI application 103 with respect to operating system.

In an embodiment, the automation testing tool 101 may compare performance of a HMI application 103 installed in an electronic device, with respect to a first model of a vehicle 105 and a second model of the vehicle 105. A single HMI application 103 may be used to control different models of a same vehicle 105 make. For example, AUDIR A4 and AUDIR A8 are two different models of same vehicle make. The functioning of the HMI application 103 with the first model may be different from functioning of the HMI application 103 with the second model. However, common features may be performed with equal efficiency. Thus, performance comparison provides an insight on HMI application 103 quality with different models of the vehicle 105.

In an embodiment, the automation testing tool 101 may compare performance of a HMI application 103, with respect to a first vehicle 105 and a second vehicle 105. For example, let us consider a HMI application for testing engine parameters of vehicles. Different vehicles may have engines of same make and type. Thus, a single HMI application may provide information on engine parameters of different vehicles having an engine of same make and model. For example, AUDIR and BMWR may share VOLKSWAGENR engine. A HMI application 103 for monitoring VOLKSWAGENR engine may be used with both AUDIR and BMWR. Performance of the HMI application 103 may be analyzed with respect to the two cars based on request and response time of data communicated by the HMI application 103 with each of the two cars.

In an embodiment, the automation testing tool 101 may determine performance of wired interface and wireless interface of the HMI feature of the HMI application 103. In an embodiment, specific applications for determining speed for wired interface and wireless interface may be used. For example, SWEETSPOTSR or SPEEDTEST.NETR may be used to determine speed of Wi-Fi and Bluetooth in vehicles 105.

In an embodiment, the automation testing tool 101 may interact with a cloud server for storing the execution results. The execution results in the cloud server may be used for generating real-time reports for the user.

In an embodiment, the automation testing tool 101 is a common framework for testing HMI applications corresponding to a plurality of vehicles.

Figure 5:
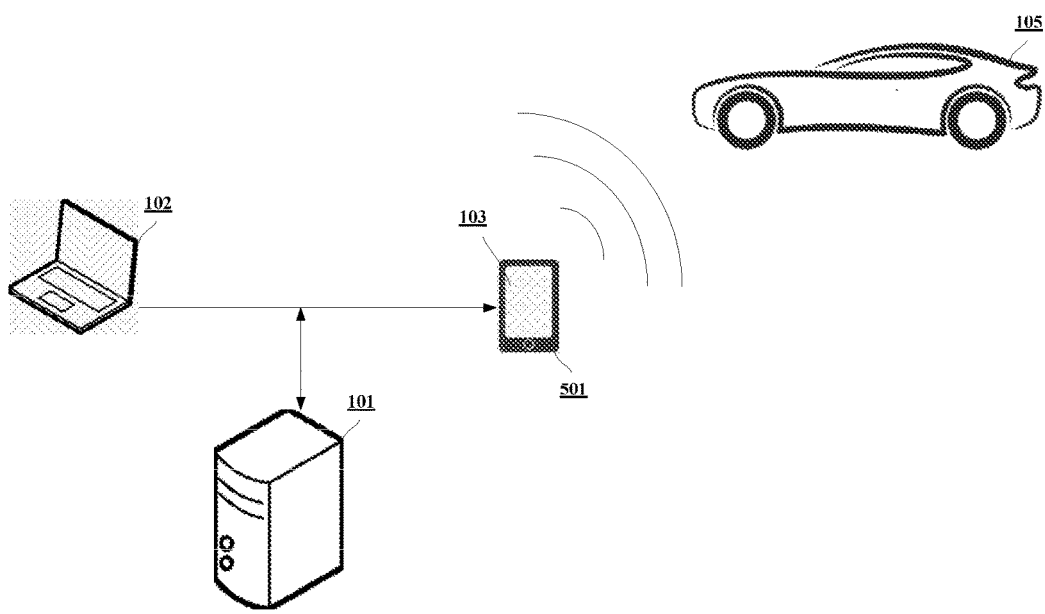
FIG. 5 is an exemplary flow diagram indicating data path in automated testing of HMI applications, in accordance with some embodiments of the present disclosure.

FIG. 5 is a block diagram of a general-purpose computer system for automated testing of HMI applications, in accordance with some embodiments of the present disclosure. As shown in FIG. 5, the one or more additional features are integrated with the HMI application 103 installed in the electronic device 501. The one or more additional features are checked by the automation testing tool 101 for errors. The automation testing tool 101 identifies one or more errors in the one or more additional features while the one or more features are integrated with the HMI application 103. The errors may be provided to a developer for rectification. Further, the automation testing tool 101 identifies the HMI application 103 having the one or more additional features, based on the one or more inputs provided by the user. In an embodiment, the automation testing tool 101 identifies the one or more additional features for executing the one or more test scripts related to only the one or more additional features. In an embodiment, the automation testing tool 101 may execute one or more test scripts for the entire functionality of the HMI application 103 along with the one or more additional features integrated with the HMI application 103. The execution of the one or more test scripts may include providing the HMI application 103 with commands to control the one or more functions of the vehicle 105. The automation testing tool 101 monitors control signals provided by the HMI application to control the one or more functions of the vehicle 105. Also, the automation testing tool 101 monitors acknowledgement signals received from the vehicle 105 in response to the control signals. Based on the monitoring, the automation testing tool generates reports of the execution of the one or more test scripts indicative of performance of the HMI application 103.

For example, consider a mobile HMI application 103 comprising a feature to control locking and unlocking doors of a vehicle 105 enabled with HMI feature. Let us assume the HMI application having the said feature is tested and is deployed for production. Let us assume a developer develops an additional feature for turning on roof lamp of the vehicle when at least one of the doors of the vehicle 105 is open. Now the additional feature is provided to the automation testing tool 101 for testing. The identification module 212 identifies the additional feature and identifies whether the vehicle 105 is HMI enabled. If the vehicle is not HMI enabled, the testing ends at this stage. Then, the CI module 203 integrates the additional feature with the HMI application 103 and identifies errors during integration of the additional feature. The CI module 203 may log the identified errors in the database 106 and may report the errors to the developer for rectification. An example of error may be, a bug in the additional feature that may not allow proper functioning of the existing feature. The CI module 203 identifies the bug during integration and reports to the developer. The developer rectifies code of the additional feature and provides the rectified code to the CI module 203. The CI module 203 again checks the code. If the code is free of errors, the CI module 203 integrates the additional feature with the existing feature. Further, the HMI application 103 comprising the existing feature and the additional feature, is provided for testing. Let us assume that test scripts are provided for the additional feature by the user. Further, the test data generator 214 may generate test data for the additional feature and combination of the additional feature with the existing feature. Thereafter, the execution module 215 executes the test scripts and concludes the testing of the HMI application.

Computer System

Figure 7:
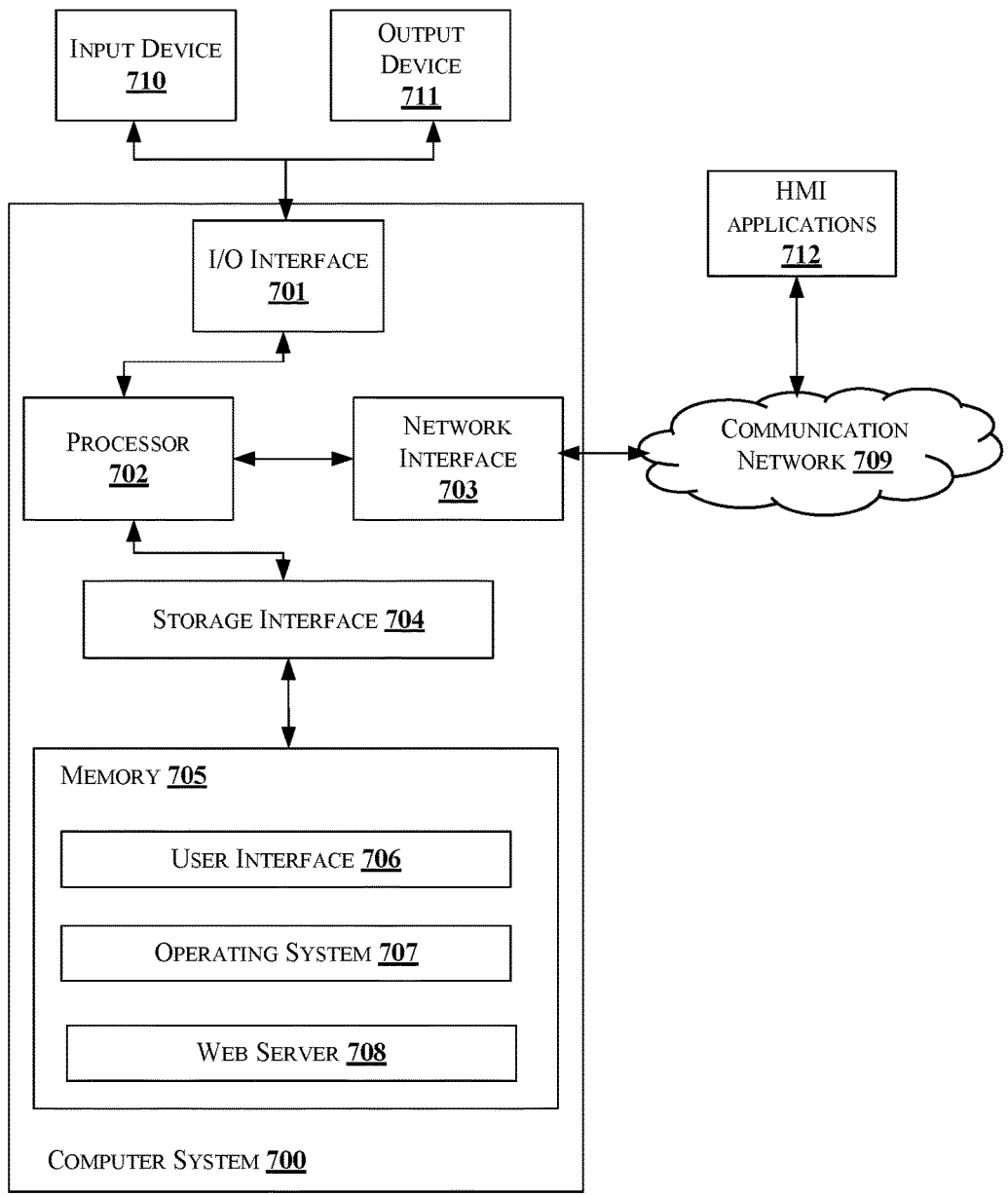
FIG. 7 is a block diagram of a general-purpose computer system for automated testing of HMI applications, in accordance with some embodiments of the present disclosure.

FIG. 7 illustrates a block diagram of an exemplary computer system 700 for implementing embodiments consistent with the present disclosure. In an embodiment, the computer system 700 is used to implement the method for automated testing of HMI applications associated with vehicles. The computer system 700 may comprise a central processing unit ("CPU" or "processor") 702. The processor 702 may comprise at least one data processor for executing program components for dynamic resource allocation at run time. The processor 702 may include specialized processing units such as integrated system (bus) controllers, memory management control units, floating point units, graphics processing units, digital signal processing units, etc.

The processor 702 may be disposed in communication with one or more input/output (I/O) devices (not shown) via I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 400 may communicate with one or more I/O devices. For example, the input device 710 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 411 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 700 is connected to the service operator through a communication network 709. The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 709 may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface 703 and the communication network 709, the computer system 400 may communicate with the one or more service operators.

In some embodiments, the processor 702 may be disposed in communication with a memory 705 (e.g., RAM, ROM, etc. not shown in FIG. 7) via a storage interface 704. The storage interface 704 may connect to memory 705 including, without limitation, memory drives, removable disc drives, etc., employing connection protocols such as serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web server 708 etc. In some embodiments, computer system 700 may store user/application data 706, such as the data, variables, records, etc. as described in this disclosure. Such databases may be implemented as fault-tolerant, relational, scalable, secure databases such as Oracle or Sybase.

The operating system 707 may facilitate resource management and operation of the computer system 700. Examples of operating systems include, without limitation, APPLE MACINTOSHR OS X, UNIXR, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLER IOS™, GOOGLER ANDROID™, BLACKBERRYR OS, or the like.

In some embodiments, the computer system 700 may implement a web browser 708 stored program component. The web browser 708 may be a hypertext viewing application, for example MICROSOFTR INTERNET EXPLORER™, GOOGLER CHROMETMO, MOZILLAR FIREFOX™, APPLER SAFARI™, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX™, DHTML™, ADOBER FLASH™, JAVASCRIPT™, JAVA™, Application Programming Interfaces (APIs), etc. In some embodiments, the computer system 700 may implement a mail server stored program component. The mail server may be an Internet mail server such as Microsoft Exchange, or the like. The mail server may utilize facilities such as ASP™, ACTIVEX™, ANSI™ C++/C#, MICROSOFTR .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFTR exchange, Post Office Protocol (POP), Simple Mail Transfer Protocol (SMTP), or the like. In some embodiments, the computer system 700 may implement a mail client stored program component. The mail client may be a mail viewing application, such as APPLER MAIL™, MICROSOFTR ENTOURAGE™, MICROSOFTR OUTLOOK™, MOZILLAR THUNDERBIRD™, etc.

In an embodiment, the computer system 700 may be connected to HMI applications 712 through a wireless network 709.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 and FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment, the present disclosure discloses a common platform for automating testing of HMI applications corresponding to a plurality of vehicles.

In an embodiment, the proposed method and system increases speed of testing and quality of testing the HMI applications.

In an embodiment, the proposed method and system can be easily integrated with different testing tools.

In an embodiment, the proposed method and system increases in-vehicle HMI software quality, thereby increasing vehicle telematics.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of automated testing of Human Machine Interface (HMI) applications associated with vehicles, comprising:

identifying, by an automation testing tool, at least one vehicle from a plurality of vehicles as HMI enabled vehicle, and a HMI application installed on an electronic device corresponding to the at least one vehicle, based on one or more inputs, wherein the HMI application comprises a plurality of features and one or more additional features being integrated with the HMI application for controlling one or more functions of the at least one vehicle, wherein identifying the at least one vehicle as HMI enabled is performed using one or more machine learning techniques;

identifying, by the automation testing tool, in real-time, one or more errors in the one or more additional features being integrated with the HMI application, wherein the one or more errors are eliminated to enable integration of the one or more additional features with the HMI application;

generating, by the automation testing tool, test data based on one or more test scripts related to the one or more additional features and historical test analysis of the HMI application corresponding to the plurality of vehicles, wherein the test data is input to the HMI application; and executing, by the automation testing tool, the one or more test scripts on the HMI application based on the test data for automated testing of Human Machine Interface (HMI) applications associated with vehicles.

2. The method as claimed in claim 1, wherein the one or more inputs comprises at least one of a vehicle model data, vehicle type, vehicle make, vehicle name, unique number of the electronic device, electronic device type, electronic device name, electronic device model data, HMI compatibility of the at least one Vehicle, or HMI application data.

3. The method as claimed in claim 2, wherein the HMI application is identified based on a correlation between the unique number of the electronic device and the at least one vehicle.

4. The method as claimed in claim 1, further comprising creating a common repository for storing a plurality of objects of the HMI application in a structured manner, utilized during execution of the one or more test scripts.

5. The method as claimed in claim 1 further comprising, generating reports of the execution of the test scripts.

6. The method as claimed in claim 5, wherein the reports are used to determine performance of a HMI application of a first vehicle with respect to performance of a HMI application of a second vehicle, and performance of a HMI application of a first model of a vehicle with respect to performance of a HMI application of a second model of the vehicle.

7. The method as claimed in claim 1, wherein the HMI application is associated with the at least one vehicle by at least one of a wired interface or a wireless interface, wherein the performance of the wired interface and the wireless interface is determined.

8. The method as claimed in claim 5, wherein the reports are used to determine performance of the HMI application installed in a first electronic device and the HMI application installed in a second electronic device, and wherein the first electronic device and the second electronic device hosts a first operating system and a second operating system respectively.

9. The method as claimed in claim 1, wherein the machine learning techniques, comprises:
populating a database with the plurality of vehicles and corresponding vehicular data;
extracting HMI related information of the at least one vehicle, from the vehicular data based on the one or more inputs; and
determining enablement of HMI in the at least one vehicle based on the extracted HMI related information and historical analysis of vehicular data corresponding to the plurality of vehicles.

10. An automation testing tool for testing Human Machine Interface (HMI) applications associated with vehicles, comprising:
a processor; and
a memory, communicatively coupled with the processor, for storing processor executable instructions, which, on execution, causes the processor to:
identify at least one vehicle from a plurality of vehicles and a HMI application installed on an electronic device corresponding to the at least one vehicle, based on one or more inputs, wherein the HMI application comprises a plurality of features and one or more additional features being integrated with the HMI application, for controlling one or more functions of the at least one vehicle, wherein identifying the at least one vehicle as HMI enabled is performed using one or more machine learning techniques;
identify, in real-time, one or more errors in the one or more additional features being integrated with the HMI application, wherein the one or more errors are eliminated to enable integration the one or more additional features with the HMI application;
generate test data based on one or more test scripts related to the one or more additional features and historical test analysis of the HMI application corresponding to the plurality of vehicles, wherein the test data is input to the HMI application; and
executing the one or more test scripts on the HMI application based on the test data for automated testing of Human Machine Interface (HMI) applications associated with vehicles.

11. The automation testing tool as claimed in claim 10, wherein the one or more inputs comprises at least one of a vehicle model data, vehicle type, vehicle make, vehicle name, unique number of the electronic device, electronic device type, electronic device name, electronic device model data, HMI compatibility of the at least one Vehicle, or HMI application data.

12. The automation testing tool as claimed in claim 11, wherein the HMI application is identified based on a correlation between the unique number of the electronic device and the at least one vehicle.

13. The automation testing tool as claimed in claim 10, associated with a repository for storing a plurality of objects of the HMI application in a structured manner, utilized during execution of the one or more test scripts.

14. The automation testing tool as claimed in claim 10, wherein the processor is further configured to generate reports of the execution of the test scripts.

15. The automation testing tool as claimed in claim 14, wherein the reports are used to determine performance of a HMI application of a first vehicle with respect to performance of a HMI application of a second vehicle, and performance of a HMI application of a first model of a vehicle with respect to performance of a HMI application of a second model of the vehicle.

16. The automation testing tool as claimed in claim 10, wherein the HMI application is associated with the at least one vehicle by at least one of a wired interface or a wireless interface, wherein the performance of the wired interface and the wireless interface is determined.

17. The automation testing tool as claimed in claim 14, wherein the reports are used to determine performance of the HMI application installed in a first electronic device and the HMI application installed in a second electronic device, and wherein the first electronic device and the second electronic device hosts a first operating system and a second operating system respectively.

18. The automation testing tool as claimed in claim 10, wherein the machine learning techniques configures the processor to:
populate a database with the plurality of vehicles and corresponding vehicular data;
extract HMI related information of the at least one vehicle, from the vehicular data based on the one or more inputs; and
determine enablement of HMI in the at least one vehicle based on the extracted HMI related information and historical analysis of vehicular data corresponding to the plurality of vehicles.

19. A non-transitory computer readable medium including instructions stored thereon that when processed by at least one processor cause a device to perform operations comprising:
identifying at least one vehicle from a plurality of vehicles as HMI enabled vehicle, and a HMI application installed on an electronic device corresponding to the at least one vehicle, based on one or more inputs, wherein the HMI application comprises a plurality of features and one or more additional features being integrated with the HMI application for controlling one or more functions of the at least one vehicle, wherein identifying the at least one vehicle as HMI enabled is performed using one or more machine learning techniques;
identifying in real-time, one or more errors in the one or more additional features being integrated with the HMI application, wherein the one or more errors are eliminated to enable integration of the one or more additional features with the HMI application;
generating test data based on one or more test scripts related to the one or more additional features and historical test analysis of the HMI application corresponding to the plurality of vehicles, wherein the test data is input to the HMI application; and
executing the one or more test scripts on the HMI application based on the test data for automated testing of Human Machine Interface (HMI) applications associated with vehicles.

20. The medium as claimed in claim 19, wherein the one or more inputs comprises at least one of a vehicle model data, vehicle type, vehicle make, vehicle name, unique number of the electronic device, electronic device type, electronic device name, electronic device model data, HMI compatibility of the at least one Vehicle, or HMI application data.

21. The medium as claimed in claim 20, wherein the HMI application is identified based on a correlation between the unique number of the electronic device and the at least one vehicle.

22. The medium as claimed in claim 19, further comprising creating a common repository for storing a plurality of objects of the HMI application in a structured manner, utilized during execution of the one or more test scripts.

23. The medium as claimed in claim 19 further configuring the processor to, generate reports of the execution of the test scripts.

24. The medium as claimed in claim 23, wherein the reports are used to determine performance of a HMI application of a first vehicle with respect to performance of a HMI application of a second vehicle, and performance of a HMI application of a first model of a vehicle with respect to performance of a HMI application of a second model of the vehicle.

25. The medium as claimed in claim 19, wherein the HMI application is associated with the at least one vehicle by at least one of a wired interface or a wireless interface, wherein the performance of the wired interface and the wireless interface is determined.

26. The medium as claimed in claim 23, wherein the reports are used to determine performance of the HMI application installed in a first electronic device and the HMI application installed in a second electronic device, and wherein the first electronic device and the second electronic device hosts a first operating system and a second operating system respectively.

27. The medium as claimed in claim 19, wherein the machine learning techniques, comprises:
    populating a database with the plurality of vehicles and corresponding vehicular data;
    extracting HMI related information of the at least one vehicle, from the vehicular data based on the one or more inputs; and
    determining enablement of HMI in the at least one vehicle based on the extracted HMI related information and historical analysis of vehicular data corresponding to the plurality of vehicles.

* * * * *